UNITED STATES PATENT OFFICE.

HENRY PHELPS GAGE AND WILLIAM CHITTENDEN TAYLOR, OF CORNING, NEW YORK, ASSIGNORS TO CORNING GLASS WORKS, OF CORNING, NEW YORK, A CORPORATION OF NEW YORK.

GLASS.

1,305,793.        Specification of Letters Patent.        Patented June 3, 1919.

No Drawing.        Application filed May 28, 1918. Serial No. 237,108.

*To all whom it may concern:*

Be it known that we, HENRY PHELPS GAGE and WILLIAM CHITTENDEN TAYLOR, citizens of the United States of America, and residents of Corning, New York, have invented certain new and useful Improvements in Glass, of which the following is a specification.

Our invention relates to a glass which has high transmission for the ultra-violet rays while absorbing practically all of the visible light, and which is useful for certain purposes where such a glass is desirable.

In making our improved glass, we make use of our discovery that oxid of nickel (NiO) when melted in a suitable batch in proportions of from ½ to 12 per cent. of the total, gives a glass having the properties desired. If, however, certain ingredients are present in the glass in substantial proportions, the desired results are not obtained to the highest extent. Among these undesirable ingredients are lime, magnesia, lead oxid, alumina, and boric oxid. Either soda or potash can be used as the alkali, while barium oxid and zinc oxid can be used as bases.

The following are compositions of glass illustrative of the broader aspects of this invention:—

Baryta glasses.

|         | (1)  | (2)   | (3)  | (4)   |
|---------|------|-------|------|-------|
| $SiO_2$ | 48 % | 54.1% | 51 % | 57.4% |
| $K_2O$  | 15.3 | 17.4  |      |       |
| $Na_2O$ |      |       | 10.6 | 12.1  |
| BaO     | 24.7 | 28    | 26.4 | 30.0  |
| NiO     | 12.0 | 0.5   | 12.0 | 0.5   |

Zinc glasses.

|         | (5)  | (6)   | (7)   | (8)   |
|---------|------|-------|-------|-------|
| $SiO_2$ | 53 % | 60 %  | 60.0% | 68.0% |
| $K_2O$  | 20.0 | 22.5  |       |       |
| $Na_2O$ |      |       | 13.8  | 15.5  |
| ZnO     | 15.0 | 17.0  | 14.2  | 16    |
| NiO     | 12.0 | 0.5   | 12.0  | 0.5   |

It will be noted that as shown by the above formula, a considerable variation in the percentage of nickel is permissible, it being understood that glasses containing small amounts of nickel transmit extreme red and infra-red as well as ultra-violet, but glasses high in nickel transmit only ultra-violet. The amount of infra-red transmitted varies therefore with the amount of nickel and the thickness of the glass. We find, however, that the most desirable results are obtained by a glass of the following composition:—

|         | (9)  |
|---------|------|
| $SiO_2$ | 50%  |
| $K_2O$  | 16%  |
| BaO     | 25%  |
| NiO     | 9%   |

If it is desired to reduce the transmission of the red without increasing the percentage of the nickel oxid, a small percentage of cupric oxid may be added. An excess of this, however, should be avoided as it tends to also reduce the ultra-violet transmission. For instance, one or two per cent. of the cupric oxid. (and preferably the former) can be used, replacing an equal quantity of the nickel oxid in formula 9.

The zinc glasses herein disclosed as illustrative of our broad invention form the subject-matter of claims in our application Sr. No. 258,056, filed Oct. 14, 1918, as a division hereof.

Having thus described our invention, we claim:—

1. A glass containing nickel oxid and substantially free from lead oxid, lime and magnesia.

2. A glass containing nickel oxid and absorbing substantially all the visible rays of light yet transmitting freely the ultra-violet portion of the spectrum.

3. A glass containing from ½% to 12% nickel oxid adapted to transmit ultra-violet and infra-red radiations, and which absorbs all light from the visible portion of the spectrum.

4. A glass containing from ½% to 12% nickel oxid substantially free from lead oxid, lime and magnesia.

5. A glass having high ultra-violet transmission to which nickel oxid has been added to absorb the visible light rays without increasing the absorption of the ultra-violet rays.

6. A barium glass containing from $\frac{1}{2}\%$ to 12% nickel oxid.

7. A glass composed of potassium barium silicate colored with oxid of nickel.

8. A glass colored with over $\frac{1}{2}\%$ nickel oxid, the nickel oxid being the sole coloring oxid with the exception of not more than 2% copper oxid.

9. A barium glass containing not over 2% copper oxid, and also nickel oxid up to 12% and no other coloring oxids.

10. A baryta glass colored with oxid of nickel.

In testimony whereof we have hereunto set our hands this 27th day of May, 1918.

HENRY PHELPS GAGE.
WILLIAM CHITTENDEN TAYLOR.